US012173676B2

(12) United States Patent
Karrer et al.

(10) Patent No.: US 12,173,676 B2
(45) Date of Patent: Dec. 24, 2024

(54) HYDROGEN DIRECT INJECTION SYSTEM AND METHOD FOR LUBRICATING A FUEL INJECTOR OF A HYDROGEN DIRECT INJECTION SYSTEM

(71) Applicants: Hyundai Motor Company, Seoul (KR); Kia Corporation, Seoul (KR)

(72) Inventors: Ulrich Karrer, Mainz (DE); Bernd Friedrichs, Riedstadt (DE); Roman Pelzetter, Reichelsheim (DE); Leigh Deissenroth, Mainz (DE); Milos Tichy, Griesheim (DE); Markus Peppler, Gau-Bischofsheim (DE); Andreas Kapp, Eschborn (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/506,250

(22) Filed: Nov. 10, 2023

(65) Prior Publication Data

US 2024/0376852 A1 Nov. 14, 2024

(30) Foreign Application Priority Data

May 12, 2023 (DE) ........................ 102023112557.5

(51) Int. Cl.
*F02M 63/00* (2006.01)
*F02M 61/16* (2006.01)

(52) U.S. Cl.
CPC ........ *F02M 63/0001* (2013.01); *F02M 61/16* (2013.01)

(58) Field of Classification Search
CPC .. F02D 41/062; F02D 41/0689; F02D 41/401; F02D 41/0047; F02D 41/0025; F02D 41/0065; F02D 19/0644; F02D 19/0692; F02D 19/0694; F02D 19/081; F02D 25/00; F02D 29/02; F02D 2200/021; F02D 2200/101; Y02T 10/30; F02B 75/24; F02B 75/32; F02B 75/002; F02B 75/025; F02B 25/00; F02B 33/32; F02B 47/02; F02M 25/00; F02M 25/038; F02M 25/12; F01N 5/04; F01N 5/025; F01B 9/02; F01B 9/026; F01B 7/16; F01B 1/08
See application file for complete search history.

(56) References Cited

U.S. PATENT DOCUMENTS 3,983,882 A * 10/1976 Billings ............ F02M 21/0206 123/25 A
6,257,175 B1 * 7/2001 Mosher .................. F02B 43/10 123/3
2002/0113017 A1 * 8/2002 Sheets .................. B01D 15/00
(Continued)

FOREIGN PATENT DOCUMENTS

KR 102027498 B1 10/2019

*Primary Examiner* — Hai H Huynh
*Assistant Examiner* — Johnny H Hoang
(74) *Attorney, Agent, or Firm* — Slater Matsil, LLP

(57) ABSTRACT

An embodiment hydrogen direct injection system for an internal combustion engine of a motor vehicle includes a fuel line and a fuel injector configured to inject hydrogen fuel into a combustion chamber of the internal combustion engine, wherein the fuel injector is configured to receive the hydrogen fuel via the fuel line and to receive water via the fuel line, and wherein the water is configured to lubricate the fuel injector.

20 Claims, 1 Drawing Sheet

(56) References Cited

U.S. PATENT DOCUMENTS

2004/0221821 A1* 11/2004 Taxon .................... F02M 25/12
123/25 A
2011/0100328 A1* 5/2011 Paul ...................... H01M 8/186
174/138 R
2011/0108000 A1* 5/2011 Williams ............... F02M 25/03
123/25 C
2020/0366180 A1* 11/2020 Mills ......................... C01B 3/00
2022/0117270 A1* 4/2022 Murray ..................... A23L 2/54
2023/0184181 A1* 6/2023 Klingbeil .............. F02D 41/062
123/445
2024/0077051 A1* 3/2024 Schmidt ............. F02M 21/0263

* cited by examiner

HYDROGEN DIRECT INJECTION SYSTEM AND METHOD FOR LUBRICATING A FUEL INJECTOR OF A HYDROGEN DIRECT INJECTION SYSTEM

CROSS-REFERENCE TO RELATED APPLICATIONS

This application claims the benefit of German Patent Application No. 102023112557.5, filed on May 12, 2023, which application is hereby incorporated herein by reference.

TECHNICAL FIELD

The present invention pertains to a hydrogen direct injection system for an internal combustion engine of a motor vehicle, a motor vehicle with such a system, and a method for lubricating a fuel injector of a hydrogen direct injection system of a motor vehicle.

BACKGROUND

Because of a combination of factors, such as environmental concerns, high oil prices, and reduced availability of crude oil, development of cleaner alternative fuels and advanced power systems for vehicles has become a high priority for many governments and vehicle manufacturers around the world. Various solutions for vehicles running on alternative fuels have thus been increasingly contemplated in recent years. One particular example in this respect are hydrogen vehicles, which use hydrogen fuel for motive power. Such vehicles typically convert the chemical energy of hydrogen to mechanical energy either by burning hydrogen in an internal combustion engine or by reacting hydrogen with oxygen in a fuel cell to power electric motors.

Dedicated fuel injectors for the use of hydrogen in internal combustion engines that are under development are often based on current designs for gasoline and/or gas injectors (e.g., for compressed natural gas). Typically, such injectors require some kind of lubrication or thermal countermeasures to reduce inner frictions, to prevent excessive wear, and/or to ensure lifetime durability.

Current gas injectors may be lubricated by a small amount of oil to reduce thermal stress. Oil has superior lubrication properties but even small amounts of oil may lead to deposit formation within the injector (especially at the injector tip area) and the combustion chamber. Besides being a potential source for $CO_2$ emissions, these deposits would be particularly relevant for hydrogen combustion engines, as the smallest amounts of oil drops or coking deposits from oil could cause pre-ignition due to the very low ignition limits of hydrogen.

Korean Publication No. 10-2027498 B1 describes a solution for preventing pre-ignition in a hydrogen combustion engine, in which two injectors fluidly couple to an intake port of the engine. A first injector injects hydrogen into the intake port, which is then mixed inside the intake port with water injected by a second dedicated water injector. The hydrogen water mixture is subsequently sucked into the combustion chamber. The water leads to higher knocking resistance and a lower tendency for pre-ignition. As a result, irregular combustion and emissions can be reduced.

SUMMARY

In light of the above, there is a need to find solutions for improving lubrication of hydrogen direct injection systems.

To this end, embodiments of the present invention provide a hydrogen direct injection system for an internal combustion engine of a motor vehicle, a motor vehicle with such a system, and a method for lubricating a fuel injector of a hydrogen direct injection system of a motor vehicle.

According to one embodiment of the invention, a hydrogen direct injection system for an internal combustion engine of a motor vehicle comprises a fuel injector configured to inject hydrogen fuel into a combustion chamber of the internal combustion engine, wherein the fuel injector is configured to receive the hydrogen fuel via a fuel line, wherein the fuel injector is further configured to receive water via the fuel line for lubrication.

According to another embodiment of the invention, a motor vehicle comprises a hydrogen direct injection system according to embodiments of the invention.

According to yet another embodiment of the invention, a method for lubricating a fuel injector of a hydrogen direct injection system of a motor vehicle comprises injecting hydrogen fuel with a fuel injector into a combustion chamber of an internal combustion chamber of the motor vehicle, wherein the fuel injector receives the hydrogen fuel via a fuel line, and wherein the fuel injector further receives water via the fuel line for lubrication.

One embodiment of the present invention uses water instead of oil as a lubricant for the hydrogen injector to avoid the potential negative drawbacks of oil. Normally, water is not considered as a potential lubricant as other materials offer better lubrication properties. However, in the case of hydrogen it avoids many of the drawbacks of these other materials. Moreover, compared to pure/dry hydrogen injection, even the moderate lubrication properties of water can help to increase an injector's lifetime. The effect can be compared in this regard to state-of-the-art gasoline direct injection systems, which rely on the rather poor lubrication properties of standard gasoline to facilitate operation in an acceptable manner.

The amount of water used for lubricating the fuel injector can be significantly lower than the typical amount of injected hydrogen (i.e., mH2 >>mH2O per stroke). The exact amount of water supplied to the fuel injector may be controlled adequately by a control of the injection system, e.g., based on operation cycles of the injector and/or the internal combustion engine, on hydrogen pressure, and/or on other parameters relevant for lubrication. Only the necessary amount of water may be supplied to the fuel injector in this regard. Technically, the amount may be controlled by one or several electric valves, for example.

Additional benefits comprise the cooling of the combustion chamber via the injected water, which may help to reduce emissions and prevent irregular combustion. Thus, not only pre-ignition but also knocking may be prevented by utilizing water for the lubrication. It should be noted in this respect that embodiments of the present invention do not rely on additional dedicated water injectors. Instead, water is merely used as lubrication of the hydrogen fuel injector.

It is understood that the term "vehicle" or "vehicular" or other similar term as used herein is inclusive of motor vehicles in general such as passenger automobiles including sport utility vehicles (SUVs), buses, trucks, various commercial vehicles, and the like, and includes hybrid vehicles, electric vehicles, plug-in hybrid electric vehicles, hydrogen-powered vehicles, and other gaseous fuel vehicles (e.g., fuels derived from resources other than crude oil). As referred to herein, a hybrid vehicle is a vehicle that has two or more sources of power, for example both combustion engine and electric-powered vehicles.

It is further understood that although a hydrogen powered vehicle having a hydrogen combustion engine and a hydrogen injector is discussed here, this principle can readily be applied to a natural gas powered vehicle using a natural gas, such as e.g., methane, as fuel and having a natural gas combustion engine and a natural gas injector.

Advantageous embodiments and improvements of the present invention are found in the subordinate claims.

According to an embodiment of the invention, the injection system may further comprise a water generator configured to generate water by combining hydrogen with oxygen. The water generator may be fluidly connected to the fuel line of the fuel injector to deliver the generated water as lubrication for the fuel injector. Correspondingly, the method may further comprise generating water with a water generator by combining hydrogen with oxygen, wherein the generated water is delivered to the fuel line of the fuel injector as lubrication for the fuel injector.

In this embodiment, the water used for lubrication is thus generated during operation of the vehicle. In this way, it can be assured that pure and clean water is used for lubrication without having to provide a dedicated water reservoir for lubrication purposes (other sources of water may not be sufficiently pure: e.g., cooling water, wiper water, etc.).

According to an embodiment of the invention, the injection system may further comprise a fuel rail fluidly connected with the water generator and the fuel line of the fuel injector to deliver the hydrogen fuel together with the generated water from the water generator to the fuel line.

Thus, there are at least two ways to couple the water generator to the fuel injector. In one embodiment, the water generator may be coupled directly to the fuel injector, that is, water may be delivered from the water generator into the fuel line of the fuel injector. In another embodiment, the generated water may first be delivered into the fuel rail and mixed there with the hydrogen fuel before it is extracted from the fuel rail into the fuel line of the fuel injector. Alternatively, hydrogen as well as water may be delivered from the water generator to the fuel rail already in a mixed state, e.g., because the water generator only converts a part of the received hydrogen to water and the rest is simply forwarded to the fuel rail.

According to an embodiment of the invention, the water generator may comprise a fuel cell for combining hydrogen with oxygen.

Hence, in this embodiment, water is generated using a fuel cell by converting the chemical energy of hydrogen and oxygen into electricity through a pair of redox reactions.

According to an embodiment of the invention, the water generator may comprise a water pump for delivering the generated water to the fuel injector. The water generator may be configured to use electricity produced by the fuel cell to power the water pump.

The water is used for lubrication and cooling of the fuel injector, while the generated electricity may be used for powering auxiliary devices of the system and/or of the vehicle. Actuating the water pump is one particularly advantageous example for utilizing the electric power generated by the fuel cell, which is thus used to deliver the generated water to the fuel injector.

According to an embodiment of the invention, the water generator may comprise a chemical reactor for combining hydrogen with oxygen in a chemical reaction.

Alternatively, or additionally, water may also be generated within a chemical reactor ($H_2+O_2 \rightarrow H_2O$). The reactor may use pure oxygen from a separate small tank together with ordinary hydrogen, e.g., hydrogen fuel from a hydrogen fuel tank of the vehicle.

According to an embodiment of the invention, the water generator may comprise a condenser for generating liquid water.

The liquid water can then be delivered together with non-reacted hydrogen from the water generator to a fuel rail and from there into the fuel line of the fuel injector, for example.

According to an embodiment of the invention, the water generator may be configured to receive the hydrogen from a hydrogen fuel tank of the motor vehicle.

Thus, the hydrogen from the fuel tank of the vehicle is not only used to supply the internal combustion engine, but also to produce the clean water utilized as lubricant for the hydrogen injector.

According to an embodiment of the invention, the water generator may be configured to receive the oxygen as air from the environment and/or to receive the oxygen from an oxygen tank of the motor vehicle.

Hence, it is possible to produce the water for lubrication from the hydrogen stored in the fuel tank of the vehicle and air from the environment without the need to store and/or transport any additional chemicals. Alternatively, or additionally, the oxygen may, however, also be delivered from a dedicated oxygen tank provided on the motor vehicle.

Embodiments of the invention will be explained in greater detail with reference to exemplary embodiments depicted in the drawings as appended.

BRIEF DESCRIPTION OF THE DRAWINGS

The accompanying drawings are included to provide a further understanding of embodiments of the present invention and are incorporated in and constitute a part of this specification. The drawings illustrate the embodiments of the present invention and together with the description serve to explain the principles of embodiments of the invention. Other embodiments of the present invention and many of the intended advantages of embodiments of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of embodiments of the present invention. Generally, this application is intended to cover any adaptations or variations of the specific embodiments discussed herein.

The following reference identifiers may be used in connection with the accompanying drawings to describe embodiments of the invention.

| | | | |
|---|---|---|---|
| 1 | fuel injector | 2 | water generator |
| 3 | fuel line | 4 | fuel rail |
| 5 | fuel cell | 6 | chemical reactor |
| 7 | condenser | 8 | control valve |
| 9 | electric line | 10 | direct injection system |
| 11 | water pump | 12 | internal combustion engine |
| 100 | motor vehicle | A | air |
| H2 | hydrogen | O2 | oxygen |
| N2 | nitrogen | H2O | water M method |
| M0, M1 | method steps | | |

DETAILED DESCRIPTION OF ILLUSTRATIVE EMBODIMENTS

Figure 1:
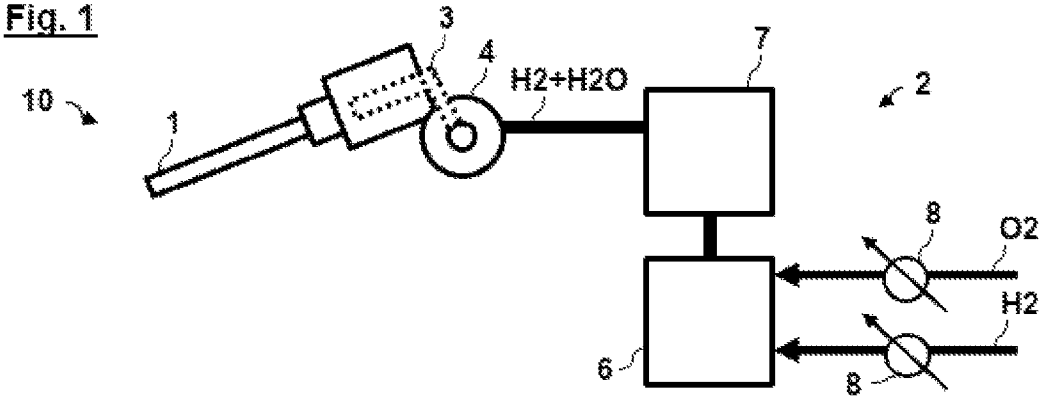
FIG. 1 schematically depicts a hydrogen direct injection system according to an embodiment of the invention.
Figure 2:
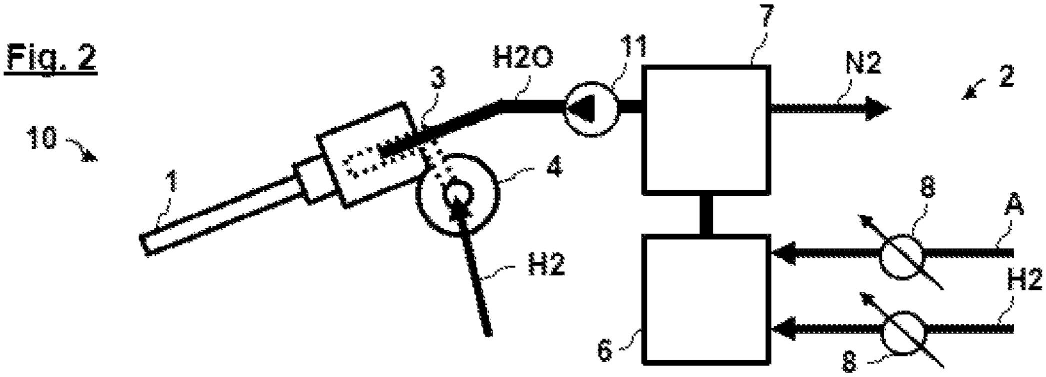
FIG. 2 schematically depicts a hydrogen direct injection system according to another embodiment of the invention.
Figure 3:
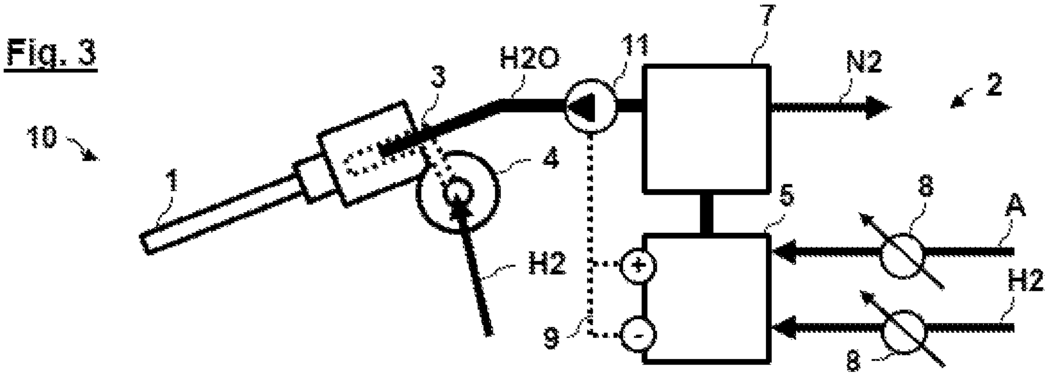
FIG. 3 schematically depicts a hydrogen direct injection system according to yet another embodiment of the invention.
Figure 4:
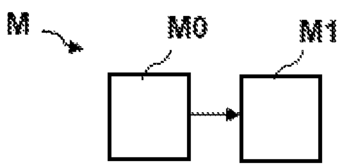
FIG. 4 shows a flow diagram of a method for lubricating a fuel injector of one of the direct injection systems of FIGS. 1 to 3.
Figure 5:
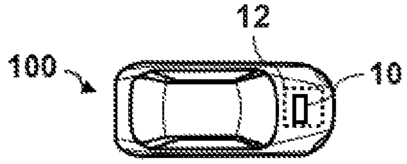
FIG. 5 schematically shows a motor vehicle comprising one of the direct injection systems of FIGS. 1 to 3.

FIGS. 1 to 3 schematically depict hydrogen direct injection systems 10 according to three different embodiments of the present invention. FIG. 4 shows a flow diagram of a method M for lubricating a fuel injector 1 of the direct injection systems 10 of FIGS. 1 to 3, while FIG. 5 schematically shows a motor vehicle 100 equipped with one of the direct injection systems of FIGS. 1 to 3.

The systems 10 and the method M are provided as a pragmatic solution for realizing hydrogen direct injection in an internal combustion engine with adequate and sufficient lubrication of the hydrogen fuel injectors 1 to avoid excessive wear and premature aging of the system components. The solution is based on the insight that water can be used as lubricant in the case of hydrogen combustion in order to avoid the potential negative drawbacks of oil or similar alternative lubricants. The water used as a lubricant is produced during operations on the basis of the hydrogen fuel stored in a fuel tank of the motor vehicle 100, as will be described now.

All three depicted hydrogen direct injection systems 10 comprise one or several fuel injectors 1 configured to inject hydrogen fuel into a combustion chamber of the internal combustion engine (ICE) 12. Each fuel injector 1 is configured to receive hydrogen as fuel via a fuel line 3 as well as water for lubrication.

The systems 10 further comprise a water generator 2 configured to generate the water for lubrication by combining hydrogen with oxygen. To this end, the water generator 2 is fluidly connected to the fuel line 3 of the fuel injector 1 to deliver the generated water as lubrication for the fuel injector 1.

The hydrogen used for the water generation is taken from the same hydrogen tank of the motor vehicle 100 (see FIG. 5) that the hydrogen fuel is also taken from to supply the internal combustion. The oxygen on the other hand can be supplied from a dedicated oxygen tank (also not shown) and/or be received as air from the environment (thereby avoiding the need for a dedicated additional tank on the vehicle 100). The specific amounts may be controlled by respective control valves 8, e.g., electric valves.

In the embodiments of FIGS. 1 and 2, the water generator 2 comprises a chemical reactor 6 for combining the hydrogen with oxygen, while a fuel cell 5 is employed for this purpose in the embodiment of FIG. 3. All three embodiments comprise a condenser 7 for liquifying the produced water. In the embodiment of FIG. 1, the chemical reactor 6 uses pure oxygen from a separate small tank (not shown) together with ordinary hydrogen fuel from the fuel tank to produce, with use of the condenser 7, liquid water, which is then delivered together with non-reacted hydrogen to a fuel rail 4, which in turn supplies the fuel line 3 of the fuel injector 1. The reaction of both components can thus be written as:

$$nH2+O_2+catalyst\rightarrow 2H_2O+(n-2)H_2+catalyst \quad \text{Equation 1}$$

$$H_2O/H_{2=2}/(n-2);n>2 \quad \text{Equation 2}$$

The configurations shown in the embodiments and drawings described in this specification are preferred examples of embodiments of the disclosure, and there may be various modifications that may replace the embodiments and drawings in this specification at the time of filing of the present application.

Water is already sufficient to reduce the inner temperatures within the injector 1 and to increase the inner lubrication. A further side-effect of the water is a decrease of the combustion temperature that simultaneously decreases NOx-emissions, which is the only main pollutant which emits from a $H_2$-ICE. Pre-ignition and knocking can be prevented by adding fluid water to the fuel/air mixture in the combustion chamber.

In the embodiment of FIG. 2, the chemical reactor 6 uses air from the environment as an oxygen source. Non-reacted nitrogen from the air can then be separated and released into the environment (upper right in FIG. 2). In this exemplary embodiment, the generated water is delivered directly into the fuel line 3 of the fuel injector 1 by a water pump 11, thereby bypassing the fuel rail 4, which is still supplied with hydrogen from the hydrogen tank. The reaction of the components can thus be written as follows in this case:

$$2H_2+O_2+xN_2+catalyst\rightarrow 2H_2O+xN_2+catalyst \quad \text{Equation 3}$$

In the embodiment of FIG. 3, the water is produced by the fuel cell 5. The fuel cell 5 reacts $H_{2+}$ and $O_{2-}$ within each layer of a membrane assembly and produces $H_2O$. The water is then used for lubricating and cooling the fuel injector 1. Also in this case, the water is directly delivered to the fuel line 3 of the fuel injector 1. The reaction can be written as follows:

$$2H_2+O_2+xN_2+catalyst=>2H_2O+xN_2+catalyst \quad \text{Equation 3}$$

The electric energy produced in the fuel cell 5 is used to actuate the water pump 11, which delivers the water to the fuel line 1. Hence, the additional benefit of this embodiment is that generated electric power can be used for auxiliaries like the water pump 11 or other electric devices. Hydrogen for combustion is delivered to the injector 1 through the primary injector inlet via the fuel rail 4.

A corresponding method M as schematically depicted in FIG. 4 thus comprises generating water with the water generator 2 by combining hydrogen with oxygen and delivering the generated water to the fuel line 3 of the fuel injector 1 for lubrication (M0) and injecting hydrogen fuel with the fuel injector into the combustion chamber of the internal combustion engine 12 (M1).

In the foregoing detailed description, various features are grouped together in one or more examples with the purpose of streamlining the disclosure. It is to be understood that the above description is intended to be illustrative and not restrictive. It is intended to cover all alternatives, modifications, and equivalents of the different features and embodiments. In particular, although a hydrogen powered vehicle having a hydrogen combustion engine and a hydrogen injector have been described in the embodiments above, this principle can readily be applied to a natural gas powered vehicle using a natural gas, such as, e.g., methane, as fuel and having a natural gas combustion engine and a natural gas injector. Many other examples will be apparent to one skilled in the art upon reviewing the above specification. The embodiments were chosen and described in order to explain the principles of embodiments of the invention and its practical applications, to thereby enable others skilled in the art to utilize embodiments of the invention and various embodiments with various modifications as are suited to the particular use contemplated.

What is claimed is:

1. A hydrogen direct injection system for an internal combustion engine of a motor vehicle, the system comprising:

a fuel line;

a fuel injector configured to inject hydrogen fuel into a combustion chamber of the internal combustion engine, wherein the fuel injector is configured to receive the hydrogen fuel via the fuel line and to receive water via the fuel line, and wherein the water is configured to lubricate the fuel injector; and a water generator configured to generate the water by combining hydrogen with oxygen, wherein the water generator is fluidly connected to the fuel line of the fuel injector to deliver the generated water as a lubricant for the fuel injector and wherein the water generator comprises a fuel cell for combining the hydrogen with the oxygen.

2. The system according to claim 1, further comprising a fuel rail fluidly connected with the water generator and the fuel line of the fuel injector to deliver the hydrogen fuel together with the generated water from the water generator to the fuel line.

3. The system according to claim 1, wherein the water generator comprises a water pump configured to deliver the generated water to the fuel injector, wherein the water generator is configured to use electricity produced by the fuel cell to power the water pump.

4. The system according to claim 1, wherein the water generator comprises a chemical reactor configured to combine the hydrogen with the oxygen in a chemical reaction.

5. The system according to claim 1, wherein the water generator comprises a condenser configured to generate the water as a liquid.

6. The system according to claim 1, wherein the water generator is configured to receive the hydrogen from a hydrogen fuel tank of the motor vehicle.

7. The system according to claim 1, wherein the water generator is configured to receive the oxygen as air from a surrounding environment.

8. The system according to claim 1, wherein the water generator is configured to receive the oxygen from an oxygen tank of the motor vehicle.

9. A motor vehicle comprising:

a vehicle body;

an internal combustion engine mounted in the vehicle body;

a fuel line;

a fuel injector configured to inject hydrogen fuel into a combustion chamber of the internal combustion engine, wherein the fuel injector is configured to receive the hydrogen fuel via the fuel line and to receive water via the fuel line, and wherein the water is configured to lubricate the fuel injector; and a water generator configured to generate the water by combining hydrogen with oxygen, wherein the water generator is fluidly connected to the fuel line of the fuel injector to deliver the generated water as a lubricant for the fuel injector and wherein the water generator comprises a fuel cell for combining the hydrogen with the oxygen.

10. The motor vehicle according to claim 9, further comprising a fuel rail fluidly connected with the water generator and the fuel line of the fuel injector to deliver the hydrogen fuel together with the generated water from the water generator to the fuel line.

11. The motor vehicle according to claim 9, wherein the water generator comprises a water pump configured to deliver the generated water to the fuel injector, wherein the water generator is configured to use electricity produced by the fuel cell to power the water pump.

12. The motor vehicle according to claim 9, wherein the water generator comprises a chemical reactor configured to combine the hydrogen with the oxygen in a chemical reaction.

13. The motor vehicle according to claim 9, wherein the water generator comprises a condenser configured to generate the water as a liquid.

14. A method comprising:

injecting hydrogen fuel with a fuel injector into a combustion chamber of an internal combustion engine of a motor vehicle, wherein the fuel injector receives the hydrogen fuel via a fuel line and wherein the fuel injector further receives water via the fuel line, the water being a lubricant for the fuel injector; and generating the water with a water generator by combining hydrogen with oxygen, wherein the generated water is delivered to the fuel line of the fuel injector as the lubricant for the fuel injector, wherein the water generator comprises a fuel cell that combines the hydrogen with the oxygen.

15. The method according to claim 14, further comprising delivering, by a fuel rail, the hydrogen fuel and the generated water from the water generator to the fuel line of the fuel injector.

16. The method according to claim 14, wherein the water generator comprises a water pump that delivers the water to the fuel injector, wherein the water generator uses electricity produced by the fuel cell to power the water pump.

17. The method according to claim 14, wherein the water generator comprises a chemical reactor that combines the hydrogen with the oxygen in a chemical reaction.

18. The method according to claim 14, wherein the water generator comprises a condenser that generates the water as a liquid.

19. The method according to claim 14, wherein the water generator receives the hydrogen from a hydrogen fuel tank of the motor vehicle.

20. The method according to claim 14, wherein the water generator receives the oxygen as air from a surrounding environment or from an oxygen tank of the motor vehicle.

* * * * *